(12) United States Patent
Tanaka et al.

(10) Patent No.: US 9,182,806 B2
(45) Date of Patent: Nov. 10, 2015

(54) PREVENTING FLOW OF CURRENT FROM SUB-CPU TO MAIN-CPU DURING POWER SAVING MODE IN AN IMAGE FORMING APPARATUS

(75) Inventors: Atsushi Tanaka, Nagoya (JP); Takayuki Tsuji, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 294 days.

(21) Appl. No.: 13/560,715

(22) Filed: Jul. 27, 2012

(65) Prior Publication Data

US 2013/0031386 A1   Jan. 31, 2013

(30) Foreign Application Priority Data

Jul. 29, 2011   (JP) ................. 2011-167129

(51) Int. Cl.
*G06F 1/32*   (2006.01)

(52) U.S. Cl.
CPC ............ *G06F 1/3265* (2013.01); *G06F 1/3243* (2013.01); *G06F 1/3287* (2013.01); *G06F 1/3293* (2013.01); *Y02B 60/121* (2013.01); *Y02B 60/1242* (2013.01); *Y02B 60/1282* (2013.01)

(58) Field of Classification Search
CPC .. G06F 1/3203; G06F 1/3243; G06F 11/0733
USPC ....................................... 713/300
See application file for complete search history.

(56) References Cited

U.S. PATENT DOCUMENTS 5,347,346 A * 9/1994 Shimizu et al. ................ 399/8
5,504,679 A * 4/1996 Wada et al. .................... 701/41
7,610,521 B2 * 10/2009 Kuramochi et al. .......... 714/712
2004/0158750 A1   8/2004 Syed et al.
2005/0015684 A1 * 1/2005 Nishikawa ...................... 714/48
2005/0108584 A1   5/2005 Kawakami et al.

(Continued)

FOREIGN PATENT DOCUMENTS

| EP | 1 821 190 A3 | 8/2007 |
| EP | 2 037 348 A3 | 3/2009 |

(Continued)

OTHER PUBLICATIONS

Japan Patent Office, Notification of Reasons for Rejection for Japanese Patent Application No. 2011-167129 (counterpart Japanese patent application), dispatched Apr. 16, 2013.

(Continued)

*Primary Examiner* — Thomas Lee
*Assistant Examiner* — Santosh R Poudel
(74) *Attorney, Agent, or Firm* — Merchant & Gould PC

(57) ABSTRACT

An electronic device, comprising: an execution unit which executes a predetermined function; a first control unit that has an input terminal and causes the execution unit to execute the predetermined function; a power source unit that supplies power at least to the first control unit; and a second control unit that has an output terminal connected to the input terminal of the first control unit via a signal line, operates to output a signal to the first control unit via the signal line, and causes the power source unit to cut off power supply to the first control unit, and wherein the second control unit keeps a potential of the signal line at a reference level lower than or equal to a predetermined threshold while the second control unit causes the power source unit to cut off power supply to the first control unit.

5 Claims, 7 Drawing Sheets

(56) References Cited

U.S. PATENT DOCUMENTS

| | | | |
|---|---|---|---|
| 2005/0135828 A1* | 6/2005 | Joichi et al. | 399/75 |
| 2005/0216776 A1* | 9/2005 | Watanabe | 713/300 |
| 2005/0268127 A1* | 12/2005 | Shiba et al. | 713/320 |
| 2007/0029882 A1* | 2/2007 | Watanabe | 307/112 |
| 2007/0106916 A1* | 5/2007 | Yanagawa | 713/300 |
| 2007/0206713 A1* | 9/2007 | Yamaguchi | 375/377 |
| 2009/0077400 A1* | 3/2009 | Enami et al. | 713/320 |
| 2009/0323120 A1* | 12/2009 | Yamanaka | 358/1.16 |
| 2010/0106993 A1* | 4/2010 | Song | 713/323 |
| 2010/0325458 A1* | 12/2010 | Yamaguchi | 713/323 |
| 2011/0004776 A1 | 1/2011 | Tanaka | |
| 2011/0208986 A1* | 8/2011 | Soga | 713/323 |

FOREIGN PATENT DOCUMENTS

| | | | | |
|---|---|---|---|---|
| EP | 1 821 190 A3 | | 11/2011 | |
| EP | 2 037 348 A3 | | 7/2013 | |
| JP | H06-089129 A | | 3/1994 | |
| JP | 2001211691 A | * | 8/2001 | ............ H02P 8/14 |
| JP | 2005-267097 A | | 9/2005 | |
| JP | 2006174307 A | * | 6/2006 | |
| JP | 2007-213137 A | | 8/2007 | |
| JP | 2007213137 A | * | 8/2007 | |
| JP | 2009-104238 A | | 5/2009 | |
| JP | 2010028727 A | * | 2/2010 | |
| JP | 2011-028727 A | | 2/2011 | |

OTHER PUBLICATIONS

European Search Report issued in EP 12178151.2, dated Apr. 4, 2014.

Japan Patent Office, Decision of Rejection for Japanese Patent Application No. 2011-167129 (counterpart Japanese patent application), dispatched Nov. 19, 2013.

* cited by examiner

US 9,182,806 B2

PREVENTING FLOW OF CURRENT FROM SUB-CPU TO MAIN-CPU DURING POWER SAVING MODE IN AN IMAGE FORMING APPARATUS

CROSS-REFERENCE TO RELATED APPLICATION

This application claims priority under 35 U.S.C. §119 from Japanese Patent Application No. 2011-167129, filed on Jul. 29, 2011. The entire subject matter of the application is incorporated herein by reference.

BACKGROUND

1. Technical Field

Aspects of the present invention relate to technique in which a first control unit and a second control unit connected to the first control unit via a signal line are provided, and the second control unit on/off controls power supply to the first control unit.

2. Related Art

Conventionally, power control devices in which a main CPU and a sub CPU are communicatively connected to each other via a PCI (Peripheral Component Interconnect) and power supply to the main CPU is on/off controlled by the sub CPU have been used. In the power control device, in order to prevent a current from flowing from the sub CPU to the main CPU in a state where power supply to the main CPU is cut off, a connection terminal between the main CPU and the sub CPU is held in a high-impedance state.

SUMMARY

In the above described power control device, since input terminals of the main CPU side and the PCI bus are brought to an electrically non-connection state (i.e., in a floating state) when I/O terminals are kept at a high-impedance state, the main CPU side and the PCI bus may be bought to a condition where errors or damages to the main CPU by electromagnetic induction might be caused. For this reason, the conventional power control device is required to have a configuration to prevent occurrence of malfunction caused by the high-impedance state, for example, by providing pull-up or pull-down resistances to the PCI bus.

Aspects of the present invention are advantageous in that they provide an electronic device capable of preventing flowing of a current from a second control unit to a first control unit which is in a power cut-off state, without bringing signal lines to a high-impedance state.

According to an aspect of the invention, there is provided an electronic device, comprising: an execution unit which executes a predetermined function; a first control unit that has an input terminal and causes the execution unit to execute the predetermined function; a power source unit that supplies power at least to the first control unit; and a second control unit that has an output terminal connected to the input terminal of the first control unit via a signal line, operates to output a signal to the first control unit via the signal line, and causes the power source unit to cut off power supply to the first control unit. In this configuration, the second control unit keeps a potential of the signal line at a reference level lower than or equal to a predetermined threshold while the second control unit causes the power source unit to cut off power supply to the first control unit.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, embodiments according to the invention will be described with reference to the accompanying drawings.

First Embodiment

Hereafter, a first embodiment is described with reference to FIGS. 1 to 3.

(Configuration of Image Forming Device)

Figure 1:
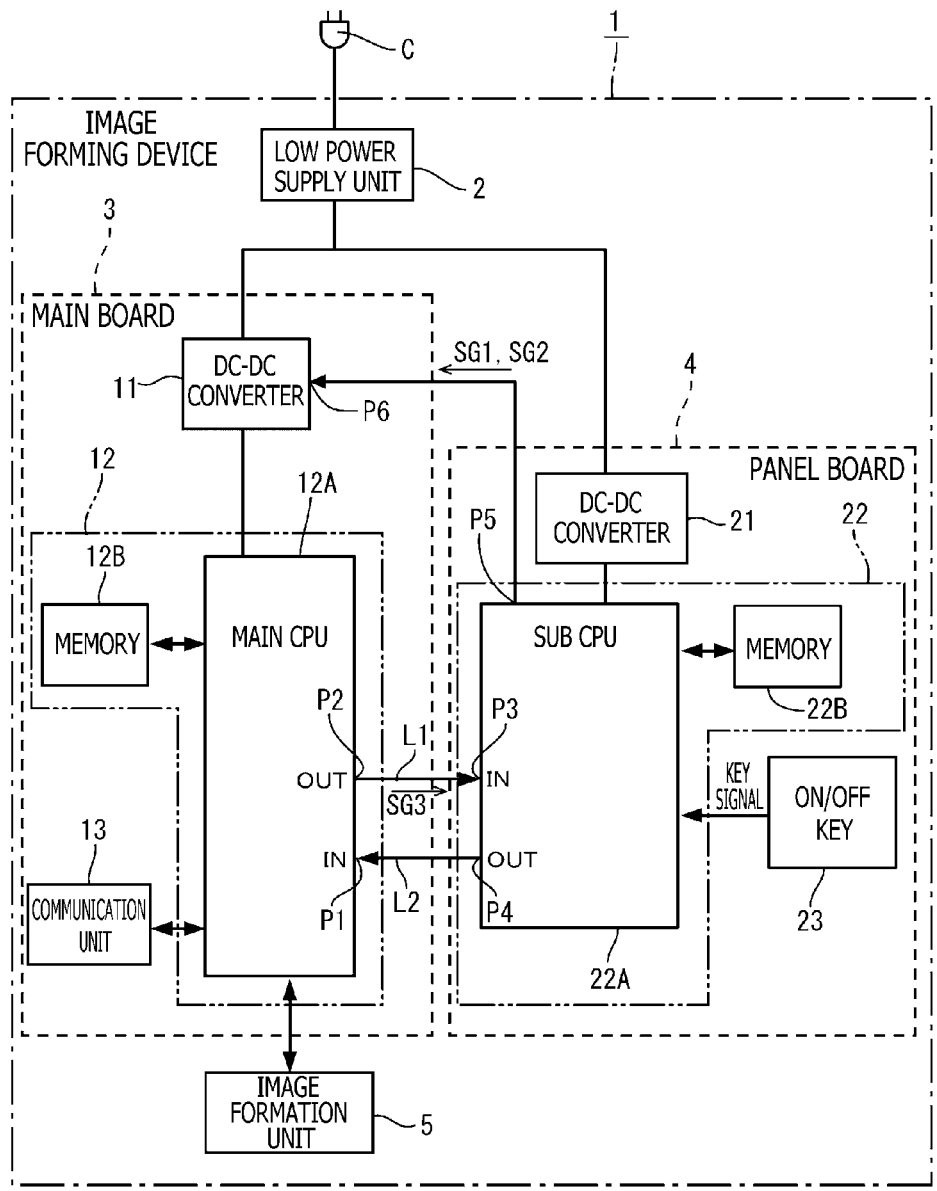
FIG. 1 is a block diagram illustrating an internal configuration of an image forming device according to a first embodiment.

As shown in FIG. 1, an image forming device 1 which is an example of an electronic device includes a low power supply unit 2, a main board 3, a panel board 4 and an image formation unit 4. The low power supply unit 2 is connected to a plug C, and is configured to output a DC voltage (e.g., 24V) by converting power supplied from a commercial power source into a DC power.

(1) Main Board

On the main board 3, a DC-DC converter 11, a main control unit 12, and a communication unit 13 are mounted. The DC-DC converter 11 steps down the DC power from the low power supply unit 2 to, for example, 6V or 3.3V, and supplies the power to the main control unit 12.

The main control unit 12 includes a main CPU 12A and a memory 12B. The main control unit 12 is activated when power is supplied thereto from the DC-DC converter 11, and controls the image formation unit 5 and the communication unit 13. Specifically, the main CPU 12A is connected to an output side of the DC-DC converter 11, and has a main input terminal P1 and a main output terminal P2. The main CPU 12A is communicatively connected to the memory 12B, the communication unit 13 and the image formation unit 5.

The memory 12B stores programs for executing various processes of the image forming device 1, such as a main control process and a control process for the image formation unit 5 which are explained later. The main CPU 12A controls the image formation unit 5 and the communication unit 13 in accordance with the programs read from the memory 12B. The memory 12B may be, a RAM, an NVRAM, a hard disk drive, a non-volatile memory such as a Flash Memory®, or a reading device which reads programs recorded on a recording medium such as a CD-R.

The communication unit 13 serves as an interface for communicating with an external device (not shown) by a wired or wireless manner. The main CPU 12A receives an image formation request and image data from the external device via the communication unit 13.

(2) Panel Board

On the panel board 4, a DC-DC converter 21, a sub-control unit 22 and an operation panel 23 are mounted. The DC-DC converter 21 steps down the DC power from the low power supply unit 2 to, for example, 6V or 3.3V, and supplies the power to the sub control unit 22.

The sub control unit 22 has a sub CPU 22A and a memory 22B. The sub control unit 22 is activated when power is supplied thereto from the DC-DC converter 21, and controls operations of the operation panel 23. Specifically, the sub CPU 21A is connected to an output side of the DC-DC converter 21, and has a sub input terminal P3 and a sub output terminal P4. The sub input terminal P3 is connected to the main output terminal P2 via a signal line L1, and the sub output terminal P4 is connected to the main input terminal P1 via a signal line L2.

The sub CPU 22A is communicatively connected to the memory 2213 and the operation panel 23. Furthermore, the sub CPU 21A has a control terminal P5, and the control terminal P5 is connected to a connection terminal P6 of the DC-DC converter 11 of the main board 3. The sub CPU 22A outputs an ON command signal SG1 (specifically, an enable signal of a high level) from the control terminal P5 to cause the DC-DC converter 11 to start supplying power to the main control unit 12. The sub CPU 22A outputs an OFF command signal SG2 (specifically an enable signal of a low level) from the control terminal P5 to cause the DC-DC converter 11 to stop supplying power to the main control unit 12.

The image forming device 1 has at least an operation mode and a reduced power consumption mode. The operation mode is a mode where power is supplied to the main control unit 12 and the image formation unit 5. The reduced power consumption mode is a mode where power is not supplied to the main control unit 12 and the image formation unit 5.

The memory 22B stores programs for executing various processes, such as a sub control process and a control process for the operation panel 23 which are explained later. The sub CPU 22A controls the operation panel 23 in accordance with a program read from the memory 22B. The memory 22B may be, a RAM, an NVRAM, a hard disk drive, a non-volatile memory such as a Flash Memory®, or a reading device which reads programs recorded on a recording medium such as a CD-R.

The operation panel 23 includes a plurality of operation keys. Through the operation panel 23, a user is able to conduct an input operation for inputting various commands and settings. The operation panel 23 includes a display device which has a display and lamps through which various setting screens and operation statuses can be displayed. As described above, the sub control unit 22 controls operations of the operation panel 23 of which working power is relatively small. Therefore, power consumption of the sub control unit 22 is smaller than that of the main control unit 12 which controls the components including the image formation unit 5 of which working power is relatively large.

(3) Image Formation Unit

The image formation unit 5 is activated when power is supplied thereto from the DC-DC converter 11, and executes a printing function for forming an image, on a sheet-like medium, based on image data received, for example, by the communication unit 13 through control of the main control unit 12. The image formation unit 5 may be of a type such as an electrophotographic printing type or an inkjet printing type.

(Main Control Process)

Figure 2:
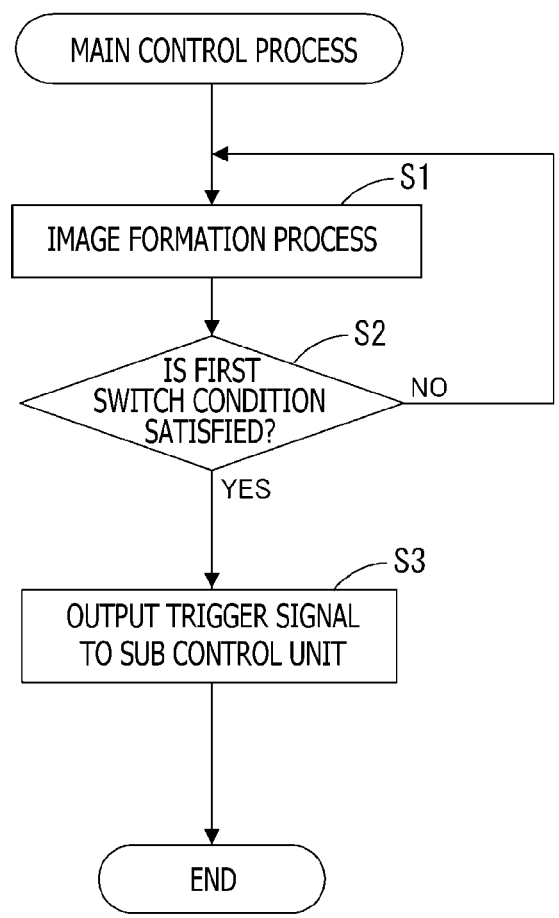
FIG. 2 is a flowchart illustrating the main control process executed by a main control unit according to the first embodiment.

The main control unit 12 executes the main control process shown in FIG. 2 when the ON command signal SG1 is outputted from the sub control unit 22 and power is supplied to the main control unit 12.

Specifically, first, the main CPU 12A executes an image formation process (step S1). More specifically, in the image formation process, the main CPU 12A judges whether an image formation request or image data is received, and when it is judged that the image formation request or image data is received, the main CPU 12A controls the image formation unit 5 to execute an image formation operation based on the received data (e.g., the image formation request), and then the process proceeds to step S2. On the other hand, when the main CPU 12A judges that an image formation request or image data is not received, the process proceeds to step S2 without controlling the image formation unit 5 to execute the image formation operation.

In step S2, the main CPU 12A judges whether a first switch condition is satisfied. The first switch condition means a condition for switching from the operation mode to the reduced power consumption mode. Examples of the first switch condition include a fact that a standby state where an image formation request is not received has continued for a predetermined time period, and a fact that a standby state where no key is operated on the operation panel 23 has continued for a predetermined time period.

When the main CPU 12A judges that the first switch condition is not satisfied (S2: NO), the process returns to step S1. On the other hand, when the main CPU 12A judges that the first switch condition is satisfied (S2: YES), the main CPU 12A outputs a trigger signal SG3 from the main output terminal P2 (S3), and terminates the main control process. The trigger signal SG3 is a signal for instructing the sub control unit 22 to switch from the operation mode to the reduced power consumption mode.

(Sub Control Process)

Figure 3:
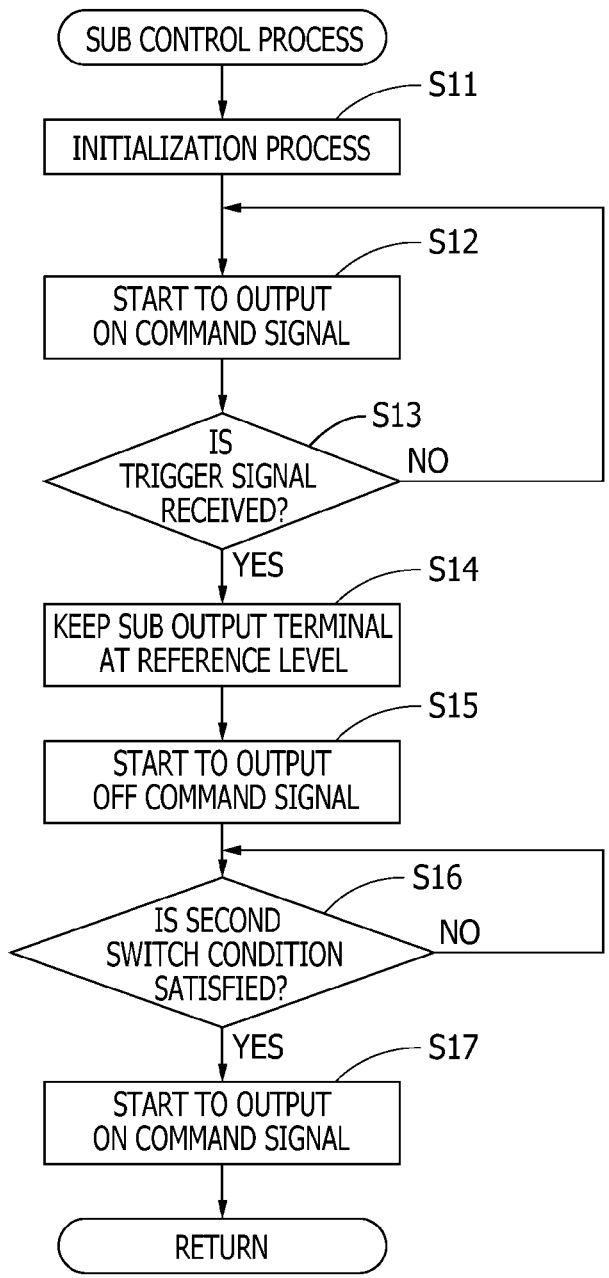
FIG. 3 is a flowchart illustrating a sub control process executed by a sub control unit.

As shown in FIG. 3, when power is supplied to the image forming device 1, the sub control unit 22 is activated by being supplied power from the DC-DC converter 21, and the sub control process is executed.

Specifically, first, the sub CPU 22 executes an initialization process (step S11). In the initialization process, for example, parameters for controlling the operation panel 23 are restored to initial values or power supplied to the main control unit 12 is forcibly stopped by outputting the OFF command signal SG2 from the control terminal P5.

After the initialization process is executed, the sub CPU 22A starts to output the ON command signal SG1 from the control terminal P5 (step S12), and causes the DC-DC converter 11 to start supplying power to the main control unit 12 and the image formation unit 5. As a result, the main control unit 12 is activated, and the main control process is executed.

Next, the sub CPU 22A judges whether the trigger signal SG3 is received from the main control unit 12 (step S13). When the trigger signal SG3 is not received (S13: NO), the process returns to step S12. That is, in this case, the operation mock is continued, and the sub CPU 22A outputs a binarized signal which is a high or low level depending on an operation signal from the operation panel 23, from the sub output terminal P4 to the main control unit 12. In this case, the high level may be, for example, 2.4V to 3.3V and the low level may be, for example, 0V to 0.4V.

When the sub CPU 22A judges that the trigger signal SG3 is received (S13: YES), the sub CPU 22A keeps the level of the sub output terminal P4 at a reference level which is lower than or equal to a predetermined threshold, i.e., the sub CPU 22A latches the reference level (step S14). Specifically, the reference level is equal to the low level of the binarized signal in the operation mode. As a result, the potential of the signal line L2 can be kept at the low level. Therefore, it becomes possible to prevent the main control unit 12 from causing malfunction due to a current flowing from the signal line L2 to the main input terminal P1.

After the sub CPU 22A keeps the sub output terminal P4 at the low level, the sub CPU 22A starts to output the OFF command signal SG2 from the control terminal P5 (step S15), and causes the DC-DC converter 11 to stop supplying power to the main control unit 12 and the image formation unit 5. As a result, the image forming device 1 switches from the operation mode to the reduced power consumption mode.

Next, the sub CPU 22A judges whether a second switch condition is satisfied in the reduced power consumption mode (step S16). The second switch condition means a condition for switching from the reduced power consumption mode to the operation mode. For example, the second switch condition is a fact that a key operation is conducted on the operation panel 23. When the sub CPU 22A judges that the second switch condition is satisfied (S16: YES), the sub CPU 22A starts to output the ON command signal SG1 from the control terminal P5 (step S17), and causes the DC-DC converter 11 to start again supplying power to the main control unit 11 and the image formation unit 5. As a result, the image forming device 1 returns from the reduced power consumption mode to the operation mode. After the sub CPU 22A starts to output the ON command signal SG1, the process returns to step S11.

Advantages of Embodiment

According to the embodiment, when power supply to the main control unit 12 is cut off, the potential of the signal line L2 is kept at the low level (S14, S15). Therefore, it is possible to prevent a current from flowing from the sub control unit 22 into the main control unit 12 which is in the power off state. Furthermore, since the signal line L2 is not brought to a high-impedance state, there is no necessity to take countermeasures with respect to a high-impedance state, such as providing a pull-up or pull-down resistance to the signal line L2.

Furthermore, after the sub CPU 22A keeps the potential of the signal line L2 at the low level, the sub CPU 22A cuts off power supply to the main control unit 12 (S14, S15). As a result, it becomes possible more securely prevent a current from flowing from the sub control unit 22 to the main control unit 12 which is in the power off state in comparison with the case where power supply to the main control unit 12 is cut off before the potential of the signal line L2 is kept at the low level.

The sub CPU 22A keeps the potential of the signal line L2 at the low level after the trigger signal SG3 is received. Therefore, it is possible to prevent occurrence of malfunction of the main control unit 12 in a state where the signal line L2 is forcibly kept at the low level in the operation mode, in comparison with the case where the potential of the signal line L2 is kept at the low level before the trigger signal SG3 is received.

Second Embodiment

FIGS. 4 to 7 illustrate a second embodiment. The major differences with respect to the first embodiment are a configuration of an image forming device 50 and parts of a main control process and apart of a sub control process. Excepting these differences, the second embodiment is substantially the same as the first embodiment. Therefore, in the following, explanations focus on the difference between the second embodiment and the first embodiment. To elements which are substantially the same as those of the first embodiment, the same reference numbers are assigned, and explanations thereof will not be repeated.

(Configuration of Image Forming Device)

Figure 4:
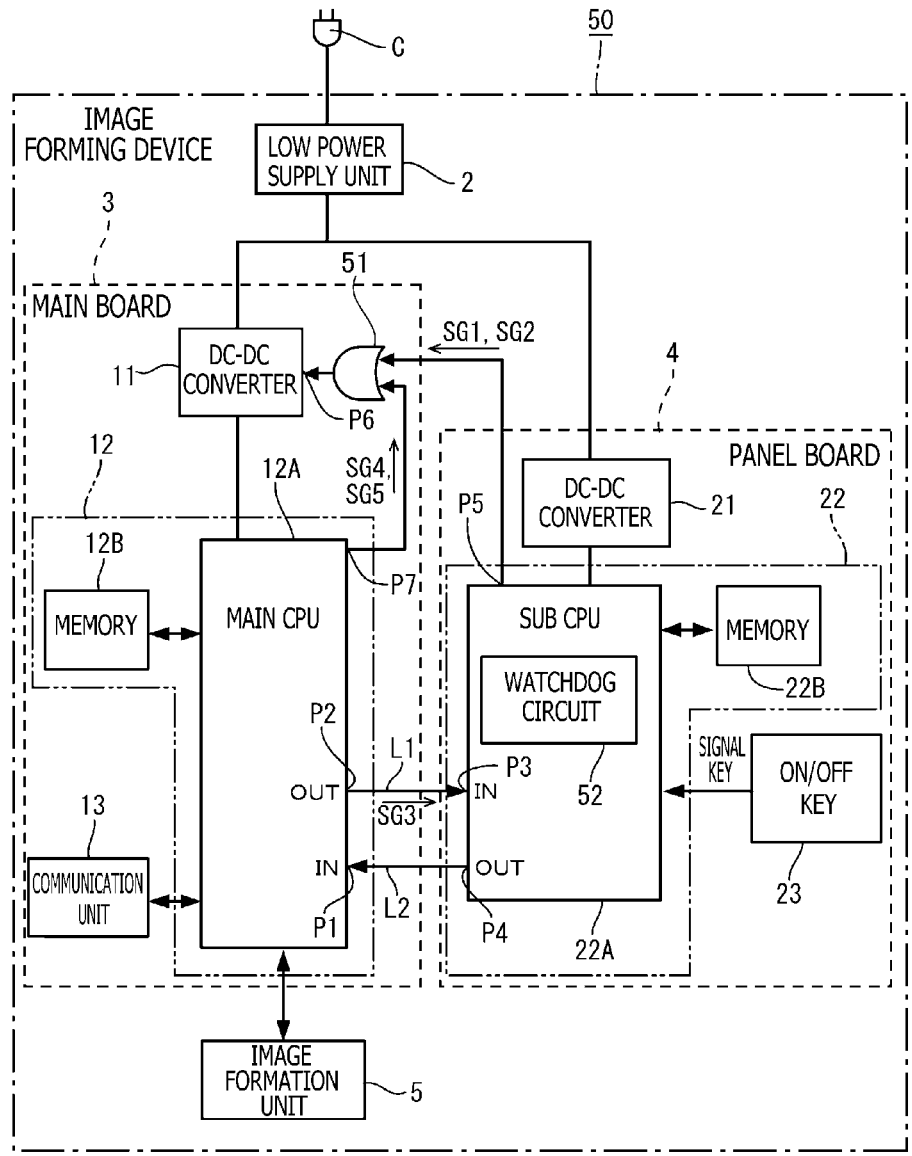
FIG. 4 is a block diagram illustrating an inner configuration of an image forming device according to a second embodiment.

As shown in FIG. 4, in the image forming device 50, the main CPU 12A has a control terminal P7, and selectively outputs an ON command signal SG4 or an OFF control signal SG5 from the control terminal P7 as in the case of the control terminal P5 of the sub CPU 22A. On the main board 3, an OR circuit 51 is provided. The OR circuit 51 is configured such that input terminals are respectively connected the control terminals P5 and P7, and an output is connected to the connection terminal P6 of the DC-DC converter P6.

The sub CPU 22A has a built-in watchdog circuit 52. The watchdog circuit 52 detects an abnormal state of the sub CPU 22A, such as hang-up. Specifically, the watchdog circuit 52 detects that the sub CPU 22A is in an abnormal state when a regular watchdog operation is not conducted based on pulses counted by the sub CPU 22A. A watchdog having a known configuration may be employed as the watchdog circuit 52, The watchdog circuit 52 may be provided outside the sub CPU 22A.

(Main Control Process)

Figure 5:
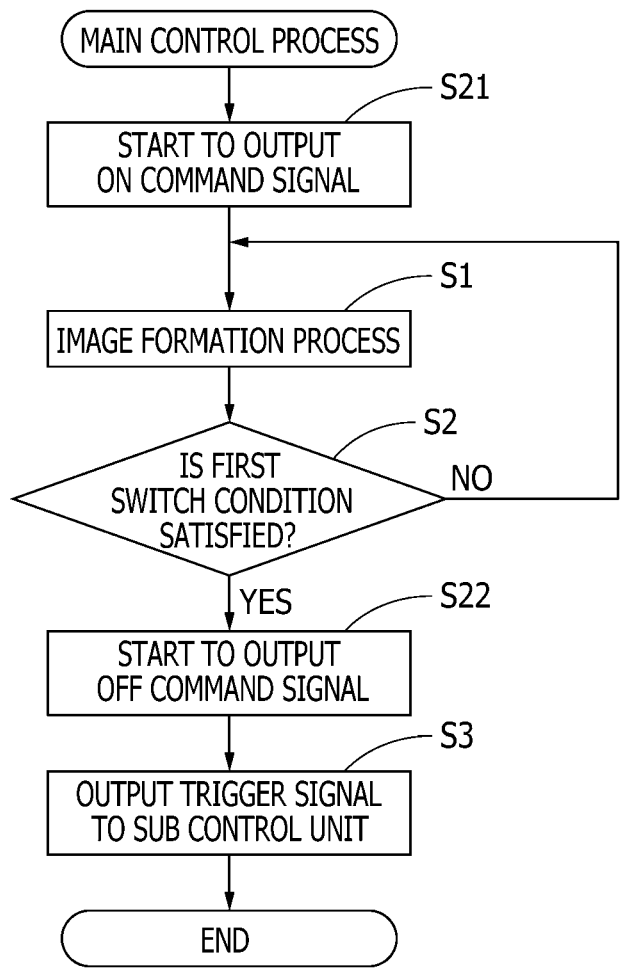
FIG. 5 is a flowchart illustrating a main control process executed by a main control unit according to the second embodiment.

As shown in FIG. 5, first, the main CPU 21A outputs the ON command signal SG4 from the control terminal P7 (step S21). As a result, it becomes possible to give the ON command signal from the OR circuit 51 to the DC-DC converter 11, and to cause the DC-DC converter 11 to keep supplying power to the main control unit 12 and the image formation unit 5 regardless of which of the ON command signal SG1 and the OFF command signal SG2 the sub control unit 22 outputs. In other words, the sub control unit 22 is brought to a state of being unable to on/off control the DC-DC converter 11. After the main CPU 12A outputs the ON command signal, the main CPU 12A executes the image formation process (step S1).

When the main CPU 12A judges that the first switch condition is satisfied (S2: YES), the main CPU 12A starts to output the OFF control signal SG5 from the control terminal P7 (step S22). As a result, the signal from the control terminal P5 of the sub control unit 22 (i.e., the ON command signal and the OFF command signal) is enabled, and the signal is supplied to the DC-DC converter 11. In other words, the sub control unit 22 becomes able to on/off control the DC-DC converter 11. After the main CPU 12A starts to output the OFF command signal SG5, the main CPU 12A outputs the trigger signal SW (step 33).

(Sub Control Process)

Figure 6:
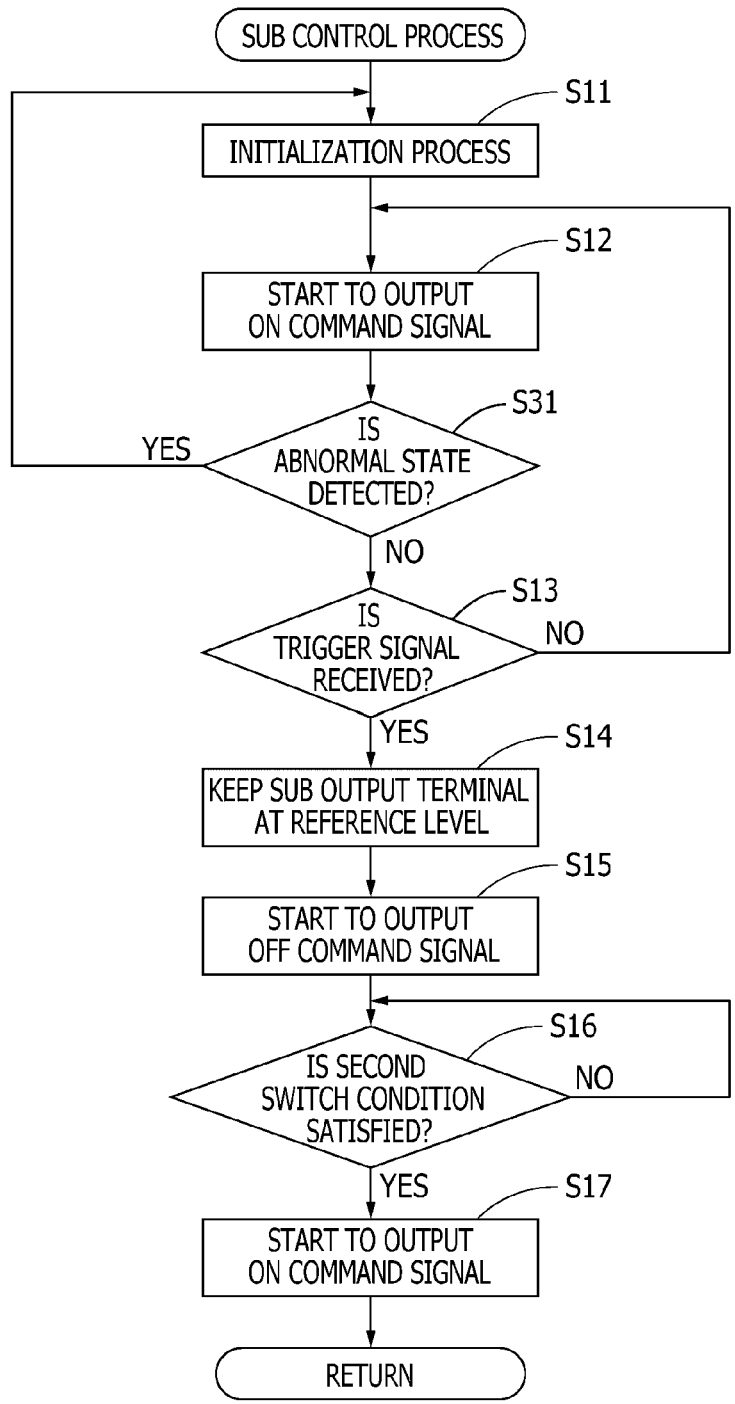
FIG. 6 is a flowchart illustrating a sub control process executed by a sub control unit according to the second embodiment.

As shown in FIG. 6, after the sub CPU 22A starts to output the ON control signal SG1 from the control terminal P5 (step S12), the process proceeds to step S31. When an abnormal state is not detected by the watchdog circuit 52 (S31: NO), the process proceeds to step S13. When an abnormal state is detected by the watchdog circuit 52 (S31: YES), the sub CPU 22A executes the initialization process to resolve the abnormal state (step S11). As a result, the sub CPU 22A outputs the OFF command signal SG2 from the control terminal P5.

Figure 7:
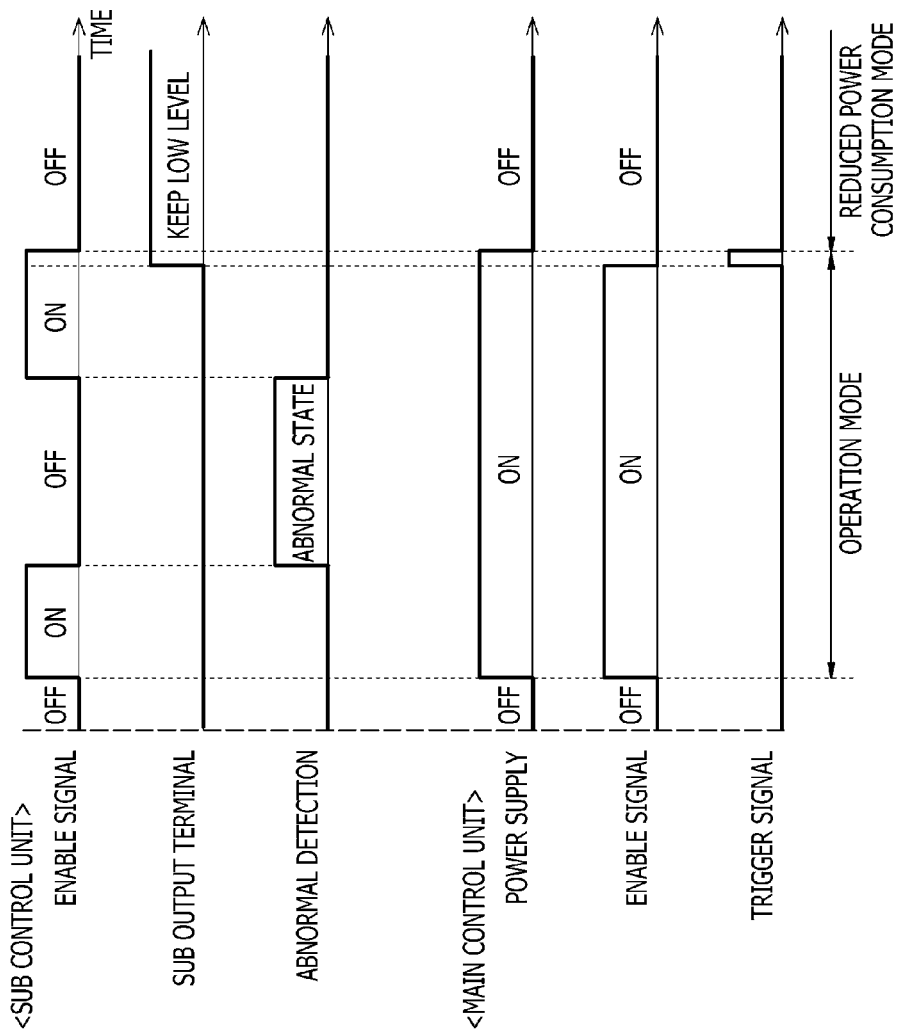
FIG. 7 is a time chart illustrating a relationship between detection of the abnormal state, the signals and presence/absence of power supply to the main control unit.

As shown in FIG. 7, when the sub control unit 22 outputs the ON command signal SG1 to the OR circuit 51 (step S12), power supply to the main control unit 12 is started. As a result, the image forming device 50 moves to the operation mode.

Then, the main control unit 12 outputs the ON command signal SG4 to the OR circuit 51 (step S21). As a result, the DC-DC converter 11 constantly keeps the ON state regardless of whether the sub control unit 22 outputs the ON command signal SG1 or the OFF command signal SG2. Therefore, even when the watchdog circuit 52 detects an abnormal state (S31: YES) and the sub control unit 22 outputs the OFF command signal SG2 (S11), power supply to the main control unit 12 is maintained.

Thereafter, the sub control unit 22 starts again to output the ON command signal SG1, and when the watchdog circuit 52 does not detect an abnormal state (S31: NO), the sub control unit 22 keeps outputting the ON command signal SG1 without executing the initialization process. Thereafter, when the main control unit 12 judges that the first switch condition is satisfied (S2: YES), the main control unit 12 starts to output the OFF control signal SG5 from the control terminal P7 (step S3). As a result, the sub control unit 22 becomes able to on/off control the DC-DC converter 11.

When the sub control unit 22 receives the trigger signal SG3, first, the sub control unit 22 keeps the sub output terminal P4 at a low level (step S14), and then outputs the OFF command signal SG2 from the control terminal P5 (step S15). As a result, power supply to the main control unit 12 is cut off. Therefore, it becomes possible to prevent a current from flowing from the sub control unit 22 into the main control unit 12 which is in the power off state in the reduced power consumption mode.

Advantages of the Embodiment

According to the embodiment, even when the sub control unit 22 erroneously outputs the OFF command signal regarding the power supply to the main control unit 12 in the state where an abnormal state of the sub control unit 22 is detected in the Operation mode, power supply to the main control unit 12 is maintained. Therefore, it becomes possible to prevent power supply to the main control unit 12 from being forcibly cut off due to the fact that the sub control unit has moved to an abnormal state in the operation mode.

Furthermore, it is possible to prevent power supply to the main control unit 12 from being cut off, by employing a relatively simple circuit structure formed of the OR circuit 51. It is also possible to prevent occurrence of malfunction, such as hang-up, in comparison with a configuration realized by software.

The OFF command signal SG5 is outputted from the main control unit 12 to the OR circuit 51 before the trigger signal SG3 for switching from the operation mode to the reduced power consumption mode is outputted. As a result, it becomes possible to promptly switch to the reduced power consumption mode at a stage of outputting the trigger signal SG3, in comparison with a configuration where the OFF command signal is outputted from the main control unit 12 to the OR circuit 51 after the trigger SG3 is outputted. It is also possible to promptly keep the sub output terminal P4 at a low level.

Other Embodiments

Although the present invention has been described in considerable detail with reference to certain preferred embodiments thereof, other embodiments are possible.

(1) in the above described embodiments, the image forming devices 1 and 50 are cited as examples of an electronic device. However, it is sufficient for the electronic device to include a first control unit and a second control unit which is connected to the first control unit via a signal line and which executes off-control of power supply to the first control unit. That is, the electronic device includes various types of devices such as an image reading device, a facsimile device and a data processing device.

(2) In the above described embodiments, the second control unit on/off controls power supply to the first control unit. However, the second control unit may be configured to only control OFF of power supply to the first control unit, and in this case ON of power supply to the first control unit may be realized by another control unit.

(3) In the above embodiment, each of the main control unit 12 and the sub control unit 22 is configured to have one CPU. However, each of the main control unit 12 and the cub control unit 22 may be configured to have a plurality of CPUs or a hardware circuit such as an ASIC (Application Specific Integrated Circuit), or may be configured to have both of a hardware circuit and a CPU. For example, a part of or all of the steps of the main control process and the sub control process may be executed by different CPUs or hardware circuits.

(4) In the above described embodiments, the image forming devices 1 and 50 are configured such that the sub control unit 22 of which power consumption is small controls on/off of power supply to the main control unit 12 of which power consumption is large. However, the present invention is not limited to such a configuration. The image forming device may be configured such that the main control unit of which power consumption is large controls on/off of power supply to the sub control unit 22 of which power consumption is small. Furthermore, the main control unit 12 and the sub control unit 22 may be configured such that the power consumptions thereof are substantially equal to each other. However, according to the above described embodiments, power consumption of the image forming device 1 can be effectively reduced because in the operation mode power supply to the main control unit 12 and the image formation unit 5 of which working power is larger can be cut off.

(5) In the above described embodiments, the image formation unit 5 is cited as an example of an execution unit which executes a predetermined function. However, the execution unit may be a unit which executes an image reading function, a facsimile function or an image display function which displays an image on a display device (not shown). Furthermore, the function of the execution unit is not limited to functions concerning image formation, and the execution unit may execute various types of functions, such as a data communication function or a data conversion function.

(6) In the above described embodiments, the low level of the binarized signal in the operation mode is cited as an example of the reference level. However, the reference level is not limited to such an example. For example, the reference level may be a central level between the high revel and the low level of the binarized signal. However, it is preferable that the reference level is higher than or equal to the low level. That is because, if the reference level is set to be lower than the low level, it becomes necessary to additionally provide a configuration for letting the level of the sub output terminal P4 to be outside the rage of the level in the operation mode.

(7) In the above described embodiments, the signal line L2 is kept at the reference level by setting the sub output terminal 94 at the reference level by the sub CPU 22A. However, the sub output terminal P4 is not necessarily set to the reference level. For example, the signal line L2 may be kept at the reference level regardless of a potential of the sub control terminal P4, by connecting the signal line L2 to the sub output terminal P4 via an external buffer circuit and causing the sub CPU 22A to output the OFF command to the buffer circuit. However, according to the above described embodiment, it is possible to keep the signal line L2 at the reference level through software without providing an external buffer circuit.

(8) In the above described embodiments, the sub CPU 22A cuts off the power supply to the main control unit 12 after keeping the potential of the signal line L2 at the low level (S14, S15). However, the present invention is not limited to such an example. For example, power supply to the main control unit 12 may be cut off before the potential of the signal line L2 is kept at the low level. However, according to the embodiments, the potential of the signal line L2 is constantly kept at the low level while the power supply to the main control unit 12 is OFF. Therefore, it is possible to prevent more securely a current from flowing from the sub control unit 22 into the main control unit 12.

(9) In the above described embodiments, the OR circuit 51 is cited as an example of a logical output unit. However, it is sufficient for the logical output unit to be configured such that when at least one of the main control unit 12 and the sub control unit 22 outputs the ON command signal, the ON command signal is outputted to the DC-DC converter 11, and in the other cases the OFF command signal is outputted to the DC-DC converter 11. Therefore, the logical output unit is not limited to the OR circuit, and may be a logical circuit which achieves the same function as the OR circuit by combining logical circuits. The logical output unit is not necessarily configured by a logical circuit. For example, a signal processing circuit may be provided in place of the OR circuit 51. In this case, the signal processing circuit may be configured such that, through a software process, the signal processing circuit enables the ON/OFF command signal from the sub control unit 22 and outputs it to the DC-DC converter 11 when receiving the OFF command signal from the main control unit 12, and outputs the ON command signal to the DC-DC converter 11 and mask the ON/OFF signal from the sub control unit 22 when receiving the ON command signal from the main control unit 21.

(10) The main CPU 12A and the sub CPU 22A may be configured to be able to perform serial communication with respect to each other. The main CPU 12A may be configured to recognize a key operation of the ON/OFF key 23 through the sub CPU 22A.

What is claimed is:

1. An electronic device, comprising:
    an operation unit;
    an image formation unit configured to execute image formation operation;
    a first control unit that has an input terminal and causes the image formation unit to execute the image formation operation;
    a power source unit that supplies power at least to the first control unit; and
    a second control unit connected to the operation unit, the second control unit being configured to:
        have an output terminal connected to the input terminal of the first control unit via a signal line;
        output an input from the operation unit as a signal to the first control unit via the signal line; and
        send, to the power source unit:
            a first instruction causing the power source unit to supply power to the image formation unit and the first control unit in an operation mode; and
            a second instruction causing the power source unit to stop supplying power to the image formation unit and the first control unit in a reduced power consumption mode,
        wherein:
        power consumption of the image formation unit is larger than power consumption of the operation unit;
        the first control unit outputs a trigger signal indicative of switching from the operation mode to the reduced power consumption mode, to the second control unit; and
    the second control unit:
    sets a potential of the signal line at a reference level lower than or equal to a predetermined threshold based on receipt of the trigger signal;
    sends the second instruction to the first control unit after setting the potential of the signal line at the reference level; and
    keeps the potential of the signal line at the reference level while the electronic device is operating in the reduced power consumption mode.

2. The electronic device according to claim 1,
    further comprising:
    an abnormal state detection unit that detects an abnormal state of the second control unit,
    wherein the power source unit keeps supplying power to the first control unit as long as the electronic device is in the operation mode, even if the second control unit sends, to the power source unit, the second instruction, when the abnormal state detection unit detects the abnormal state during the operation mode.

3. The electronic device according to claim 2,
    further comprising an logical output unit to which an ON command signal and an OFF command signal from the first control unit and the ON command signal and the OFF command signal from the second, control unit are inputted, the ON command being a signal causing the power source unit to supply power to the image formation unit, the OFF command signal being a signal causing the power source unit to stop supplying power to the image formation unit;
    wherein:
    the first control unit outputs the ON command signal for power supply as long as the electronic device is operating in the operation mode;
    the logical output unit outputs the ON command signal to the power source unit when at least one of the first control unit and the second control unit outputs the ON command signal; and
    the logical output unit outputs the OFF command signal to the power source unit when both of the first control unit and the second control unit output the OFF command signals.

4. The electronic device according to claim 3, wherein the first control unit outputs the OFF command signal when the first control unit outputs the trigger signal.

5. The electronic device according to claim 1,
    further comprising an logical output unit to which an ON command signal and an OFF command signal from the first control unit and the ON command signal and the OFF command signal from the second control unit are inputted, the ON command being a signal causing the power source unit to supply power to the image formation unit, the OFF command signal being a signal causing the power source unit to stop supplying power to the image formation unit, wherein:
  after outputting to the logical output unit, the OFF command signal, the first control unit outputs the trigger signal to the second control unit;
  after receiving the trigger signal, the second control unit keeps a potential of the signal line at the reference level lower than or equal to the predetermined threshold and outputs, to the logical output unit, the OFF command signal;
  the logical output unit outputs the ON command signal to the power source unit when at least one of the first control unit and the second control unit outputs the ON command signal; and
  the logical output unit outputs the OFF command signal to the power source unit when both of the first control unit and the second control unit output the OFF command signals.

* * * * *